United States Patent [19]
Ohsaki et al.

[11] Patent Number: 5,543,229
[45] Date of Patent: Aug. 6, 1996

[54] METHOD OF MAKING A HEAT TREATED COATED GLASS

[75] Inventors: Hisashi Ohsaki; Hiroyasu Kojima; Koichi Suzuki, all of Yokohama, Japan

[73] Assignee: Asahi Glass Company Ltd., Tokyo, Japan

[21] Appl. No.: 967,438

[22] Filed: Oct. 28, 1992

[30] Foreign Application Priority Data

Oct. 30, 1991 [JP] Japan ................................. 3-311723

[51] Int. Cl.$^6$ .................................................. C03C 17/34
[52] U.S. Cl. ......................... 428/432; 428/216; 428/433; 428/472; 428/697; 428/698; 428/701; 428/702
[58] Field of Search ................................. 428/698, 472, 428/432, 433, 697, 699, 701, 702, 216

[56] References Cited

U.S. PATENT DOCUMENTS

| | | | |
|---|---|---|---|
| 4,847,157 | 7/1989 | Goodman et al. | 428/426 |
| 5,073,451 | 12/1991 | Iida et al. | 428/336 |
| 5,085,926 | 2/1992 | Iida et al. | 428/216 |
| 5,342,675 | 8/1994 | Kobayashi et al. | 428/216 |
| 5,377,045 | 12/1994 | Wolfe et al. | 359/585 |

FOREIGN PATENT DOCUMENTS

| | | |
|---|---|---|
| 0224704 | 6/1987 | European Pat. Off. . |
| 0229921 | 7/1987 | European Pat. Off. . |
| 0239750 | 10/1987 | European Pat. Off. . |
| 0301755 | 2/1989 | European Pat. Off. . |
| 0402075 | 12/1990 | European Pat. Off. . |
| 0436045 | 7/1991 | European Pat. Off. . |
| 0500445 | 8/1992 | European Pat. Off. . |
| 3902596 | 8/1990 | Germany . |
| 3941797 | 6/1991 | Germany . |
| 3942990 | 6/1991 | Germany . |
| 63-206333 | 8/1988 | Japan . |
| 63-242948 | 10/1988 | Japan . |
| 1-145351 | 6/1989 | Japan . |
| 2-164744 | 6/1990 | Japan . |
| 2-233534 | 9/1990 | Japan . |

OTHER PUBLICATIONS

"The Growth Mechanism of Diamond Crystals in Acetylene Flames", Yasuji Matsui et al, *Japanese Journal of Applied Physics*, vol. 29, No. 8, Aug. 1990, pp. 1552–1560.

"Diamond and Non–Diamond Carbon Synthesis in an Oxygen–Acetylene Flame", L. M. Hanssen et al, *Thin Solid Films; Preparation and Characterization*, 196, (1991), pp. 271–281.

"The Nucleation and Morphology of Diamond Crystals and Films Synthesized by the Combustion Flame Technique", K. V. Ravi et al, *J. Mater. Res.*, vol. 5, No. 11, Nov. 1990, pp. 2356–2366.

"Growth of Textured Diamond Films on Si(100) by $C_2H_2$/$O_2$ Flame Method", J. Hwang et al, *J. Mater. Res.*, vol. 5, No. 11, Nov. 1990, pp. 2334–2336.

"Diamond Synthesis in Oxygen–Acetylene Flames: Inhomogeneities and the Effects of Hydrogen Addition", D. B. Oakes et al, *J. Appl. Phys.*, 69 (4), Feb. 15, 1991, pp. 2602–2610.

"Towards a General Concept of Diamond Chemical Vapour Deposition", Peter K. Bachmann et al, *Diamond and Related Materials*, No. 1, (1991) pp. 1–12.

Patent Abstracts of Japan, vol. 13, No. 49 (C–565), Feb. 3, 1989, JP–A–63 242 948, Oct. 7, 1988.

(List continued on next page.)

*Primary Examiner*—Archene Turner
*Attorney, Agent, or Firm*—Oblon, Spivak, McClelland, Maier & Neustadt, P.C.

[57] ABSTRACT

A method of making a heat treated coated glass comprising the steps of: forming a solar control layer or an electroconductive layer on a glass substrate; forming a first protective layer composed of a non-oxide or not completely oxidized, which is transparent in a region of visible light, and which remains transparent even when oxidized, to provide a glass coated with a multi-layer comprising at least two layers including said solar control layer or an electroconductive layer and said first protective layer; and performing heat-treatment for said coated glass.

8 Claims, 1 Drawing Sheet

OTHER PUBLICATIONS

Patent Abstracts of Japan, vol. 14, No. 544 (C–784), Dec. 4, 1990, JP–A–02 233 534, Sep. 17, 1990.
Patent Abstracts of Japan, vol. 12, No. 496 (C–555), Dec. 23, 1988, JP–A–63 206 333, Aug. 25, 1988.
Patent Abstracts of Japan, vol. 13, No. 402 (C–633), Sep. 6, 1989, JP–A–01 145 351, Jun. 7, 1989.
Patent Abstracts of Japan, vol. 14, No. 427 (C–758), Sep. 13, 1990, JP–A–02 164 744, Jun. 25, 1990.
Patent Abstracts of Japan, vol. 13, No. 72 (C–570), Feb. 17, 1989, JP–A–63 265 844, Nov. 2, 1988.
Patent Abstracts of Japan, vol. 14, No. 522 (C–778), Nov. 15, 1990, JP–A–02 217 339, Aug. 30, 1990.

5,543,229

1
METHOD OF MAKING A HEAT TREATED COATED GLASS

This invention relates to a method of making a heat treated coated glass, particularly to a method of making a heat treated coated glass which minimizes changes of characteristics thereof before and after bending thereof.

Conventionally, a bent coated glass is made by performing a coating on a glass which is already bent. Or, it is made by bending a glass coated with a metallic film or a metal nitride film to be protected which is sandwichingly covered with an easily oxided metal such as tantalum, and in bending thereof, the easily oxided metal is mainly oxided, thereby protecting the film to be protected. Or, it is made while preventing the oxidation of the film to be protected by maintaining a nonoxidizing atmosphere during the bending.

Among the above technologies, in the method of coating the bent glass, it is not possible to perform a uniform coating on the bent glass, unless the coating process and the coating condition are controlled complying with a configuration of the bent glass. Accordingly, it is difficult to obtain products thereof provided with the high quality and the uniform performance.

On the other hand, in the method of sandwiching the layer to be protected by the easily oxided metal, characteristics of the coated glass change before and after the bending. Therefore, in a plane glass which shares the same characteristics with the obtained bent glass, a different film construction should be prepared, or a heat treatment which is the same with that in the bending should be performed. Accordingly, a considerable extravagance is present in the product control.

Moreover, in the method of maintaining the nonoxidizing atmosphere during bending, revamping of a normal bending device is necessitated, which increases the production cost. As the heat treating of glass, tempering is generally performed which is similar to bending. With respect to a tempered coated glass, the situation is the same as in the bent coated glass.

It is an object of the present invention to provide a method of making a heat treated coated glass wherein a coated plane glass having an excellent uniformity is made by employing a normal coating technology to a plane glass at a low cost, and bending and/or tempering which is generally easily performed is performed thereon without the necessity of an atmosphere control and by heating thereof in the normal oxygen-containing atmosphere, with almost no change of the coated layer to be protected which mainly influences optical characteristics thereof.

According to a first aspect of the present invention, there is provided a method of making a heat treated coated glass comprising the steps of:

forming a solar control layer or an electroconductive layer on a glass substrate;

forming a first protective layer composed of a non-oxide or not completely oxidized, which is transparent in a region of visible light, and which remains transparent even when oxidized, to provide a glass coated with a multi-layer comprising at least two layers including said solar control layer or an electroconductive layer and said first protective layer; and performing heat-treatment for said coated glass.

According to a second aspect of the present invention, there is provided the method of making a heat treated coated glass according to the first aspect, wherein a second protective layer which is composed of a metal oxide and is transparent, is formed on the first protective layer, to provide a glass coated with a multi-layer composed of at least three layers including the solar control layer or an electroconductive layer, the first protective layer and said second protective layer, and then a heat-treatment is performed for said coated glass.

Figure 1:
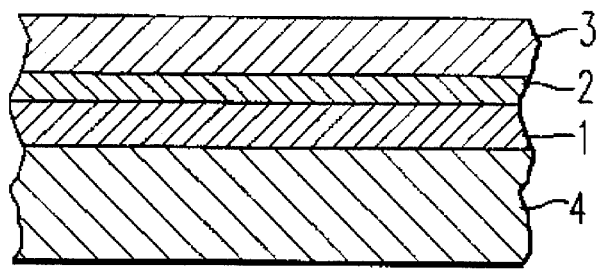
FIG. 1 is a sectional diagram of an example of heat treated coated glass which is made by the present invention, FIGS. 2 and 3, sectional diagrams showing other examples of heat treated coated glass according to the present invention.

In these Figures, a reference numeral 1 designates a solar control layer, 2, a first protective layer, 3, a second protective layer and 4, a glass substrate.

In the present invention, as the solar control layer 1, a film provided with a solar energy absorbing function having a light absorption characteristic at least with respect to a portion of a region of wave length of the solar ray, or a film provided with a light reflection characteristic mainly with respect to a region of near infrared ray, or the like can be used.

Specifically, a film whose major component is at least one of stainless steel, titanium, chromium, zirconium, tantalum and hafnium (hereinafter, defined as metal M), a nitride of the metal M, a boride of the metal M, a carbide of the metal M or a mixture of these, or a film whose major component is a metal such as silver, aluminium, chromium or the like, is pointed out. In case of the nitride, the boride, the carbide or the like, a thickness thereof is preferably approximately from 100 Å to 800 Å to obtain the solar control property. In case of the metal film, the film thickness is preferably 20 Å to 300 Å.

This is invention is applicable to an electroconductive layer whose carriers are caused from the oxygen vacances, in place of the solar control layer. As the examples of materials of such films, an indium oxide doped with tin, a tin oxide doped with antimony or fluorine, or a zinc oxide doped with aluminum, boron or silicon, etc., can be pointed out. Moreover, $ZnO$, $TiO_2$, $SnO_2$, $ThO_2$, $V_2O_5$, $Nb_2O_5$, $Ta_2O_5$, $MoO_3$, $WO_3$, $MnO_2$, $PbCrO_4$, are also the examples of the materials of the above electroconductive layer. Hereinafter "solar control layer" represents not only the above solar control layer but also the above electroconductive layer in this specification.

The first protective layer 2 is a film which is a film of a non-oxide or a film that is not completely oxidized, and which is transparent in the visible light region and which is transparent in the visible light region even when it is oxidized. The first protective layer 2 is a film which prevents diffusion of oxygen into the solar control layer 1 even when it is heated in the heat treatment, or, which does not discharge oxygen to the solar control layer 1 even when the first protective layer 2 per se contains oxygen. Since in the first protective film, only the refractive index thereof changes, the change of absorption is not caused and a transparency thereof is maintained even when it is oxidized, no considerable influence is applied on the optical characteristics thereof after the heat treatment.

The most preferable example of the first protective layer 2, is a film whose major component is at least one of a boron nitride, a carbon nitride and a silicon nitride. Especially, a representative example is a film whose major component is a nitride of silicon or boron, or a film whose major component is a nitride of at least two of silicon, boron, aluminium, zirconium and tin, particularly a film of a zirconium siliconitride, a film of tin siliconitride or the like. Or, it may be a film whose major component is a partially oxided substance of the nitride, the boronitride, the carbonitride, the siliconitride and the like. Among these, the silicon nitride and the zirconium siliconitride are particularly provided with an excellent oxygen barrier performance. In the film of the nitride or the like as the above-mentioned first protective film, the invention is applicable thereto so far as it is transparent in the visible light region, even when the nitride is not bonded in the most general stoichiometrical ratio. For instance, in case of the silicon nitride, $Si_3N_4$ is the general composition. However, this invention is applicable so far as the film is transparent in the visible light region. The atomic ratio of N to Si is preferably 1.25 or more, because the silicon nitride film is transparent in the visible light region.

When the second protective layer 3 is formed as an outermost layer, the thickness of the first protective layer 2 depends on the oxygen barrier performance, and is determined in consideration of a quantity of oxygen which is defused inside through the second protective layer. In the normal heat treatment, the thickness is preferably at least about 10 Å, particularly 20 Å or more.

In this invention, the effect of the invention can be provided even when the second protective film is not formed and the first protective film is formed with a thickness of the film which is thick to some degree. The film thickness should be determined in consideration of a film thickness of a portion of the film of which is oxidized in the heat treatment.

The second protective layer 3 is preferably composed of a metal oxide, is a transparent film in the visible light region, and provided with a high oxygen barrier performance. Specifically, an oxide such as a tin oxide, a zinc oxide, a zirconium oxide, a tantalum oxide, a niobium oxide, a titanium oxide, a silicon oxide or the like is pointed out as the metal oxide. The thickness of the second protective layer 3 is determined in consideration of the thickness of the first protective layer 2, and the optical characteristics in view of a total of the coated glass and the like.

Figure 2:
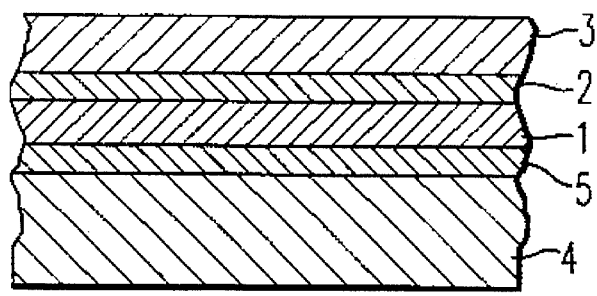

In the present method, it is preferable to form a film which displays the same function with that in the first protective film, between the solar control film 1 and the glass substrate 4, to shield oxygen diffused from the glass substrate in a very small quantity, that is, a non-oxide film or a film that is not completely oxidized, which is transparent even when it is oxidized, as a first underlayer 5, as shown in FIG. 2.

As the materials of such first underlayer 5, the materials described for the first protective layer 2 can be similarly used.

In this invention, the solar control layer 1 to be protected can be perfectly protected from the oxidation during the heating process for bending and/or tempering, by the first protective layer 2, and, in some cases, by the first protective layer 2 together with the first underlayer 5.

Figure 3:
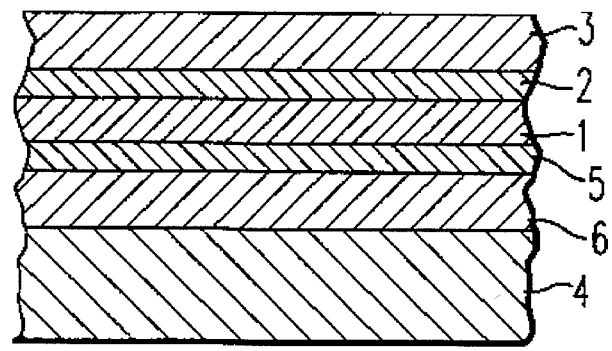

Furthermore, in the invented method, a film may be formed as a second underlayer 6 which is composed of a metal oxide and is transparent, between the glass substrate 4 and the first underlayer 5, as shown in FIG. 3, to obtain a desired optical characteristic (transmittance, reflectance, color tone etc.) by employing interference of light, or to promote the durability such as the adherence. As the second underlayer 6, the film exemplified as the first protective layer can be utilized. In this invention, the change of characteristics of the coated layers can be minimized, because the two metal oxide layers of the second protective layer 3 and the second underlayer 6 which have no change during the heating decrease the oxygen diffusing to the first protective layer 2 and first underlayer 5 which absorb said oxygen and change only their refractive indices.

Furthermore, without being restricted by these films, a desired film may be formed between the glass substrate 4 and the first underlayer 5.

The glass substrate 4 is not particularly restrained. Various glass plates such as a soda-lime glass plate or a heat ray absorbing glass plate can be employed.

The bending method as the heat treatment is not particularly restrained and may be a normally performed method wherein coated glass is heated at approximately 580° to 700° C. (which temperature depends on the composition of a glass) in the atmosphere and is bent. Naturally, it may be bent in a nonoxidizing atmosphere. However, in that case revamping of a device or the like is necessary and the production cost is increased. The tempering method as the heat treatment is also not particularly restrained and may be a normal method wherein coated glass is heated at approximately 500° to 700° C. in the atmosphere and rapidly cooled. It is possible to perform the tempering continuously successive to the bending. The tempering may be a full-tempering or a semi-tempering.

In the heat treated coated glass, there may be caused almost no change in the composition of the first protective layer, since the oxidation thereof is not promoted in case wherein the oxygen barrier performance of the second protective film is excellent. However, the first protective layer often contains oxygen more than that before the heat treatment, since the oxidation thereof is promoted by the heating in the heat treatment. In some cases, it is converted into an oxide by discharging nitrogen or carbon in the first protective layer in the heat treatment. Or, when the second protective layer is not formed, some degree of oxidation is promoted from the surface of the first protective layer but the first protective layer is in a state wherein the oxidation thereof is not performed to a portion adjacent to the solar control layer.

The solar control layer 1 which covers glass, is normally oxidized in the heat treatment by oxygen in an atmospheric gas (the atmosphere) which is diffused to the inside thereof through the oxide film protecting the solar control layer 1 and by a combined oxygen in the contiguous oxide film, thereby considerably changing the optical characteristics thereof, particularly the heat ray shielding function, the visible light transmittance and the like (the electroconductivity in case of an electroconductive layer).

In this invention, as the second protective layer 3 for the protection, one which is provided with an excellent oxygen barrier performance is selected thereby considerably reducing the oxygen diffusing inside thereof. Furthermore, the first protective layer 2 is provided between the second protective layer 3 and the solar control layer 1. Accordingly, the first protective layer 2 mainly reacts with the oxygen diffused inwardly through the second protective layer in a very small amount or the combined oxygen in the second protective layer, thereby preventing the diffused oxygen and the combined oxygen to reach the solar control layer 1 to be protected. Therefore, the solar control layer 1 suffers almost no change.

Furthermore, even when the second protective layer 3 is not formed, the first protective layer sufficiently absorbs the oxygen from the atmosphere during the heat treatment and plays a role of an oxygen barrier. Therefore, the solar control layer 1 suffers almost no change.

Since the solar control layer 1 suffers almost no change in view of a total of the multi-layer coated on glass, although the refractive index of the first protective layer changes more or less, as a total of the film, there causes no change in the optical characteristics which takes place in the conventional heat treatment.

EXAMPLE 1

A reactive sputtering is performed on the plane glass substrate 4 employing a tin target in a mixture of oxygen and argon gases, thereby forming the second underlayer 6 (250 Å)composed of a tin oxide. Next, another reactive sputtering is performed thereon employing a zirconium silicide alloy target in nitrogen gas, thereby forming the first underlayer 5 (50 Å) composed of a zirconium siliconitride.

Next, a third reactive sputtering is performed thereon employing a chromium target in nitrogen gas thereby forming the solar control layer 1 (100 Å) composed of a chromium nitride. Thereafter, the first protective film 2 (50 Å) composed of a zirconium siliconitride similar to the first underlayer 5, and the second protective film 3 (300 Å) composed of a tin oxide similar to the second protective layer 6 are formed. In this way, a coated glass having the construction as shown in FIG. 3, is provided.

The plane coated glass is put into an electric furnace wherein it is heated at about 630° C. in the atmospheric environment and the bending thereof is performed. There is no change in the solar control layer 1, the second protective layer 3 and the second underlayer 6 after the bending as compared with those before the bending. The first protective film 2 and the first underlayer 5 after the bending are partially oxidized. The optical characteristics of the coated glass before and after the heating are shown in Table 1.

Comparative Example 1

A tin oxide layer (250 Å), a chromium nitride layer (100 Å) and a tin oxide layer (300 Å) are successively formed on a plane glass substrate by the sputtering method similar to Example 1. The heat treatment similar to that in Example 1 is performed on the obtained plane coated glass and the optical characteristics before and after the heating are measured. The result is shown in Table 1.

Comparative Example 2

A chromium nitride layer (100 Å) is formed on a plane glass substrate by the sputtering method similar to that in Example 1. The heat treatment similar to that in Example 1 is performed on the obtained plane coated glass. The optical characteristics before and after the heating thereof are shown in Table 1.

TABLE 1

| | | Color coordinate according to CIE 1931 (XYZ) | | | Color difference before & after heating according to CIE 1976 (L*u*v*) |
|---|---|---|---|---|---|
| | | Visible light transmittance: Y | x | y | |
| Coated glass of Example 1 | Before bending | 44.7% | 0.299 | 0.307 | — |
| | After bending | 46.0% | 0.297 | 0.306 | 1.67 |
| Coated glass of Comparative Example 1 | Before bending | 46.9% | 0.304 | 0.309 | — |
| | After bending | 51.8% | 0.308 | 0.312 | 3.97 |
| Coated glass of Comparative Example 2 | Before bending | 30.4% | 0.317 | 0.323 | — |
| | After bending | 78.6% | 0.314 | 0.321 | 29.19 |

EXAMPLE 2

A coated glass as in FIG. 3 (that is, a coated glass having a construction of glass substrate/tin oxide layer (320 Å)/silicon nitride layer/chromium nitride layer (136 Å)/silicon nitride layer/tin oxide layer (280 Å)), is obtained by a method similar to Example 1 except that the silicon nitride layers are formed as the first underlayer 5 and the first protective layer 2, by performing a reactive sputtering employing silicon targets in nitrogen gas.

The changes of the optical characteristics are shown in Table 2, in cases wherein the heat treating temperature is varied with respect to three kinds of film thicknesses, namely 30 Å, 20 Å and 0 Å (that is, a case wherein the silicon nitride is not formed) of the silicon nitride layers as the first underlayer 5 and the first protective layer 2. The atomic ratio of nitrogen to silicon in the silicon nitride layers in Example 2 was 1.35.

By the comparison of the results of Example 1, Comparative Examples 1 and 2, and Table 2, it is found that the coated glass of this invention suffers little change with respect to the optical characteristics thereof in the heat treatment in the atmosphere and the significance of the invented method is clarified.

TABLE 2

| Film thickness of silicon nitride (Å) | Heating temperature (°C.) | Color coordinate according to CIE 1931 (XYZ) | | | Color difference before & after heating according to CIE 1976 (L*u*v*) |
|---|---|---|---|---|---|
| | | Visible light transmittance: Y (%) | x | y | |
| 30 | Before heating | 48.57 | 0.2973 | 0.3207 | — |
| | 530 | 48.39 | 0.2975 | 0.3186 | 1.46 |
| | 600 | 49.15 | 0.2976 | 0.3186 | 1.51 |
| | 620 | 49.91 | 0.2987 | 0.3201 | 1.45 |
| | 640 | 49.73 | 0.2981 | 0.3189 | 1.69 |
| | 660 | 48.80 | 0.2987 | 0.3193 | 1.59 |
| 20 | Before heating | 51.44 | 0.2999 | 0.3225 | — |
| | 530 | 51.13 | 0.2992 | 0.3198 | 1.67 |
| | 600 | 51.04 | 0.3010 | 0.3210 | 1.74 |
| | 620 | 53.85 | 0.3007 | 0.3209 | 1.93 |
| | 640 | 53.69 | 0.3008 | 0.3207 | 2.02 |
| | 660 | 51.56 | 0.3035 | 0.3226 | 2.50 |
| 0 | Before | 46.67 | 0.2962 | 0.3170 | — |

TABLE 2-continued

| Film thickness of silicon nitride (Å) | Heating temperature (°C.) | Color coordinate according to CIE 1931 (XYZ) | | | Color difference before & after heating according to CIE 1976 (L*u*v*) |
|---|---|---|---|---|---|
| | | Visible light transmittance: Y (%) | x | y | |
| | heating | | | | |
| | 530 | 49.58 | 0.2996 | 0.3185 | 2.70 |
| | 600 | 51.04 | 0.3001 | 0.3185 | 3.50 |
| | 620 | 52.01 | 0.3000 | 0.3192 | 3.92 |
| | 640 | 53.20 | 0.3002 | 0.3192 | 4.57 |
| | 660 | 54.58 | 0.3003 | 0.3190 | 5.27 |

This invention has an advantage wherein the coating can be performed by the normally utilized coating device for a plane glass substrate. Therefore, the coating control is extremely easy, whereby a glass having the high quality and covered with a uniform film can be obtained at a low cost.

Furthermore, in this invention, since the heat treatment can be performed in the atmosphere dispensing with an atmospheric control, the fabrication cost is extremely inexpensive and there is no change in the optical characteristics before and after the heat treatment. Therefore, in case of employing a plane glass and a bent glass and/or a tempered glass in combination thereof, the same kind of coated glass, that is, a non-heat-treated one for the former and a bent and/or tempered one for the latter, can be employed. Accordingly, it is not necessary to prepare a plane glass having optical characteristics after they are changed by the heat treatment, with a film having a construction different from those in a bent glass or a tempered glass, as in the conventional case.

We claim:

1. A coated glass, comprising:
   a) a glass substrate which has been subjected to heat treatment; and
   b) a multi-layer coating applied to said glass substrate prior to said heat treatment, said coating comprising:
      b)1) a solar control or electroconductive layer formed onto the surface of said glass substrate, wherein said solar control layer comprises a metal selected from the group consisting of stainless steel, titanium, chromium, zirconium, tantalum, hafnium, silver and aluminum; and
      b)2) a first protective coating layer formed on said solar control or electroconductive coating layer, said protective coating layer comprising one or more of:
         b)2)i) a nitride selected from the group consisting of a silicon nitride, a siliconitride, a boron nitride, and a boronitride;
         b)2)ii) a composite nitride of silicon or boron or both and at least one selected from the group consisting of carbon, aluminum, zirconium and tin; and
         b)2)iii) a partially oxidized coating of b)2)i) or b)2)ii) or both, and
   wherein said protective coating is transparent in a region of visible light.

2. The coated glass of claim 1, further comprising:
   b) 3) a second protective coating layer formed onto said first protective coating layer, which is transparent in a region of visible light and is a metal oxide.

3. The coated glass of claim 2, wherein said metal oxide of said second protective coating layer is a metal oxide selected from the group consisting of the oxides of tin, zinc, zirconium, tantalum, niobium, titanium and silicon.

4. The coated glass of claim 1, wherein said first protective coating layer comprises a silicon nitride, a boron nitride, a zirconium siliconitride or a tin siliconitride.

5. The coated glass of claim 2, wherein said first protective coating layer comprises silicon nitride, a boron nitride, a zirconium siliconitride or a tin siliconitride.

6. The coated glass of claim 3, wherein said first protective coating layer comprises silicon nitride, a boron nitride, a zirconium siliconitride or a tin siliconitride.

7. A coated glass, comprising:
   a) a glass substrate which has been subjected to heat treatment;
   b) a multi-layer coating applied to said glass substrate prior to said heat treatment, said coating comprising:
      b)1) a solar control or electroconductive layer formed onto the surface of said glass substrate, wherein said solar control layer comprises one or more of:
         b)1)i) a nitride selected from the group consisting of a silicon nitride, a siliconitride, a boron nitride and a boronitride;
         b)1)ii) a metal nitride selected from the group consisting of the nitrides of stainless steel, titanium, chromium, zirconium, tantalum and hafnium; and
         b)1)iii) a metal boride selected from the group consisting of the borides of stainless steel, titanium, chromium, zirconium, tantalum and hafnium; and
         b)1)iv) a metal carbide selected from the group consisting of the carbides of stainless steel, titanium, chromium, zirconium, tantalum and hafnium;
      wherein said electroconductive layer comprises:
         b)1)v) an electroconductive metal oxide or metal- or fluorine-doped metal oxide, said metal oxide being selected from the group consisting of indium oxide, tin oxide, zinc oxide, titanium dioxide, tin dioxide, thorium dioxide, vanadium pentoxide, niobium pentoxide, tantalum pentoxide, molybdenum trioxide, tungsten trioxide, manganese dioxide and lead chromate;
      b)2) a first protective coating layer formed on said solar control or electroconductive layer, comprising one or more of:
         b)2)i) a nitride selected from the group consisting of a boron nitride, a boronitride, a silicon nitride, a carbonitride and a siliconitride;
         b)2)ii) a composite nitride of silicon or boron or both and at least one selected from the group consisting of carbon, aluminum, zirconium and tin;
         b)2)iii) a partially oxidized coating of b)2)i) or b)2)ii) or both,
   wherein said protective coating is transparent in a region of visible light,
   said coated glass further comprising:
      b)3) a second protective coating layer formed on said first protective coating layer, which is transparent in a region of visible light and is a metal oxide selected from the group consisting of the oxides of tin, zinc, zirconium, tantalum, niobium, titanium and silicon.

8. The coated glass of claim 7, wherein said protective coating layer comprises silicon nitride, a boron nitride, a zirconium siliconitride or a tin siliconitride.

* * * * *